US006377575B1

United States Patent
Mullaney et al.

(10) Patent No.: US 6,377,575 B1
(45) Date of Patent: Apr. 23, 2002

(54) HIGH SPEED CROSS POINT SWITCH ROUTING CIRCUIT WITH WORD-SYNCHRONOUS SERIAL BACK PLANE

(75) Inventors: John P. Mullaney, Minneapolis, MN (US); Gary M. Lee, Camarillo, CA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 0 days.

(21) Appl. No.: 09/129,662

(22) Filed: Aug. 5, 1998

(51) Int. Cl.[7] .............................................. H04L 12/50
(52) U.S. Cl. ...................................... 370/360; 370/514
(58) Field of Search .......................... 370/360, 509–514

(56) References Cited

U.S. PATENT DOCUMENTS

| | | |
|---|---|---|
| 3,597,547 A | 8/1971 | Roll |
| 3,798,378 A | 3/1974 | Epstein |
| 4,271,508 A | 6/1981 | Schenk |
| 4,605,928 A | 8/1986 | Georgiou |
| 4,630,045 A | 12/1986 | Georgiou |
| 4,646,300 A | 2/1987 | Goodman et al. |
| 4,665,533 A | 5/1987 | Tomikawa |
| 4,719,624 A | 1/1988 | Bellisio |
| 4,752,777 A | 6/1988 | Franaszek |
| 4,777,640 A | 10/1988 | Turner et al. |
| 4,821,258 A | 4/1989 | Fraser |
| 5,058,130 A | 10/1991 | Park |
| 5,084,871 A | 1/1992 | Carn et al. |
| 5,148,113 A | 9/1992 | Wight et al. |
| 5,245,603 A | 9/1993 | Newman |
| 5,285,482 A | 2/1994 | Sehier et al. |
| 5,341,369 A | 8/1994 | Langer |
| 5,359,630 A | 10/1994 | Wade et al. |
| 5,367,520 A | 11/1994 | Cordell |
| 5,452,306 A | 9/1995 | Turudic et al. |
| 5,481,563 A | 1/1996 | Hamre |
| 5,509,008 A | 4/1996 | Genda et al. |
| 5,511,070 A | 4/1996 | Lyles |
| 5,519,698 A | 5/1996 | Lyles et al. |
| 5,528,637 A | 6/1996 | Sevenhans et al. |
| 5,541,916 A | 7/1996 | Nobuyuki |
| 5,598,443 A | 1/1997 | Poeppleman ................. 375/359 |
| 5,604,735 A | 2/1997 | Levinson et al. ........... 370/360 |
| 5,654,815 A | 8/1997 | Bunse ......................... 359/158 |

(List continued on next page.)

Primary Examiner—Salvatore Cangialosi
(74) Attorney, Agent, or Firm—Christie, Parker & Hale, LLP

(57) ABSTRACT

An asynchronous serial crosspoint switch is word synchronized to each of a number of transceiver circuits. The crosspoint switch circuit generates both a master bit clock and a master word clock signal. A transceiver circuit recovers the master bit clock signal from an incoming high-speed serial data stream using a clock and data recovery circuit. The recovered bit clock signal is used as a timing signal by which data is serialized and transmitted to the crosspoint switch circuit. The data stream transmitted to the switch circuit is frequency locked to the master bit clock signal, such that the serial data stream need only be phase adjusted with a data recovery circuit. To recover word timing, the switch circuit issues alignment words to the transceivers during link initialization. The transceivers perform word alignment and establish a local word lock. Alignment words are then reissued to the switch circuit using the local word clock. The switch circuit compares the boundary of the received word clock to the master word clock and, if misaligned, the transceiver shifts its transmitted word by one bit and retries. Necessary edge transition density is provided by overhead bits which also designate special command words asserted between a transceiver and a switch circuit. Flow control information is routed from a receiving transceiver back to the transmitting transceiver using the overhead bits in order to assert a ready-to-receive or a not-ready-to-receive flow control signal. The overhead bits additionally provide information regarding connection requests and other information.

12 Claims, 8 Drawing Sheets

U.S. PATENT DOCUMENTS

| | | |
|---|---|---|
| 5,654,987 A | 8/1997 | Nakamura ................... 375/355 |
| 5,680,389 A * | 10/1997 | Douglas et al. ............. 370/228 |
| 5,689,530 A | 11/1997 | Honaker, Jr. ................ 375/286 |
| 5,689,533 A | 11/1997 | Brauns et al. .............. 375/360 |
| 5,696,800 A | 12/1997 | Berger ........................ 375/361 |
| 5,717,728 A | 2/1998 | Hein et al. .................. 375/355 |
| 5,719,908 A | 2/1998 | Greeff et al. ............... 375/376 |
| 5,732,339 A | 3/1998 | Auvray et al. ........... 455/192.2 |
| 5,745,530 A | 4/1998 | Baek et al. ................. 375/342 |
| 5,757,652 A | 5/1998 | Blazo et al. |
| 5,757,857 A | 5/1998 | Buchwald ................... 375/271 |
| 5,757,872 A | 5/1998 | Banu et al. ................. 375/372 |
| 5,761,254 A | 6/1998 | Behrin ....................... 375/355 |

\* cited by examiner

HIGH SPEED CROSS POINT SWITCH ROUTING CIRCUIT WITH WORD-SYNCHRONOUS SERIAL BACK PLANE

FIELD OF THE INVENTION

The present invention relates to high speed data communication network systems and, more particularly, to a bit and word synchronized high speed serial switch routing system.

BACKGROUND OF THE INVENTION

Modern, high-speed data communication and transmission frequently involves the use of multiple transmitters and receivers communicating with one another, or with multiple memory devices, for example, over high-speed data transmission lines. Such high-speed data transmission generally imposes stringent requirements on clock synchronization. Further, high speed data communication systems require large amounts of data to be sent to various different locations or devices comprising a communication network. This is typically performed by using networking devices, conventionally termed switches or routers, which receive data from a particular transmitter and reconfigure a signal path in order to send the data to a designated recipient. Conventional switches or routers implement a "switch fabric" using integrated circuits to provide a data route from a receiving input port to a correct output port of the networking device (the switch). The data routes often implemented in high-speed switch fabrics are generally one bit wide. Thus, for such switches the switch fabric routes data over a plurality of serial data paths.

Modern high-speed communication systems place inordinate demands upon the performance requirements of the switch of a network switching system. The switch must be able to operate at a sufficiently high bandwidth such that signal processing is not unduly delayed while data is being transferred. Further, connections are frequently being made and broken, such that delays often occur while waiting for a connection. In addition, the various possible routes through the switch fabric from one port to another port are not always of equal length. Therefore, signal path lengths, and signal delays, change with each reconfiguration of the switch.

FIG. 1 illustrates a prior art semi-schematic simplified block diagram of a network switching system. As illustrated in FIG. 1 a crosspoint switch or router circuit is typically implemented as a number of integrated circuit components configured on a printed circuit board or card 10. The switch need not be a crosspoint switch, delta or other switch types may also be used. The switch 10 comprises a switch matrix or fabric 12 which is reconfigurable under control of a central processing unit 14 to receive data from a switch port circuit 16 and route the data to a designated recipient switch port.

Data is transmitted to, and received from corresponding switch ports by a multiplicity of transceiver circuits 18. The transceiver circuits are configured to move data to and from a particular user application through transmit and receive FIFOs over parallel interface busses. Parallel data is serialized and directed to a particular switch port over a high-speed serial interface. Likewise, serial data is received by the transceiver 18 from a corresponding switch port 16. The transceiver deserializes the serial data and interfaces with a user application circuit through a receive FIFO over a parallel data bus.

Each of the transceivers 18 typically include a clock and data recovery circuit (CDR) 20. The CDR locks onto the incoming serial data stream in order to recover clock information suitable for controlling the timing of the various registers comprising the transceiver. As noted above, when control signals to the crosspoint switch change the switch configuration, the delay through the crosspoint also changes. Because of this delay change, the CDR must realign itself to the phase of the new data stream.

In addition, prior art-type transceiver circuits are typically constructed with their own reference clock generator 22. The reference clock generator functions as a frequency reference for the CDR 20 such that the CDR 20 is able to operate in "fly wheel" mode during periods when there is no data. Since reference clock generators may be frequency mismatched by approximately 100 PPM with respect to one another, it is possible that a serial bit stream developed by one transceiver and received by a second transceiver is sufficiently shifted in phase such that a certain number of bits might be lost in each transmitted frame. Moreover, during long periods of transmission from one transceiver to another data may be lost due to timing drift because the clocks of various transceivers may be of slightly different frequencies. This necessitates periodic switch reconfiguration to force transceiver resynchronization, with prior art switches usually having a cell period defining a maximum continuous transmission length. Each time transmission is interrupted to force resynchronization, of course, effective switch bandwidth is reduced. Further, variations due to transceiver frequency mismatch and the changing delay paths through a crosspoint matrix are random in direction as well as frequency. Adjusting a CDR in response to a serial data stream received from a first transceiver may result in over-correction, particularly if the serial data stream from a next transceiver is jittered in the other direction.

In addition, the crosspoint switch delay change caused by reconfiguration can be larger than one bit time, such that word or frame realignment must also be performed by the receiving transceiver. Word or frame realignment is a generally lengthy process requiring many bit times to perform. Thus, a dead period is induced in the data stream which contains no valid data. In asynchronous transmission mode switches, for example, this realignment dead period reduces the effective bandwidth of a network switching system by approximately 10–20%. Moreover, phase recovery circuitry must be made as fast as possible to compensate for transceiver frequency mismatch and to minimize realignment induced dead time. Conventional systems typically use up an additional 10–20% of bandwidth in order to provide a minimum number of transitions to guarantee that the serial data stream comprises a sufficiently high transition rate to support fast phase recovery circuits.

Serial data transmission may also be synchronous. In synchronous data transmission the sequence of binary "ones" and "zeros", making up the data stream, occurs with reference to a data bit cell defined by a uniform or single-frequency clock signal transmitted with the data. Transmitting the clock signal together with the data, however takes up valuable bandwidth, increases high speed line requirements, and reduces the data transmission capability of the system. In addition, word alignment must still be performed.

The effects of jitter, or bit shift, in a serial data stream are illustrated in FIG. 2. Data has been phase-locked to a bit clock signal wherein data is stable within a particular bit period such that it may be strobed into an input register on the falling edge of bit clock. Given perfect phase and frequency lock, the periodicity of the bit clock signal might serve to define synchronous bit cells; a logical high data occurring within a code bit cell representing a logic ONE, a logical zero on data occurring within a code bit cell representing a logic zero. The data sequence illustrated would therefore be read as 11011000.

Phase jitter, frequency mismatch, and/or a delay change through the switch matrix, has displaced, or shifted, the serial data stream by approximately 90 degrees in phase. Data stability, of the late data stream, occurs outside of the intended code bit cell, and into the next code bit cell, causing the data stream sequence to be incorrectly read as 01101100 rather than 11011000. Thus, it can be seen that by merely shifting a particular serial data stream by approximately 90 degrees in phase, the binary sequence comprising a data word, as represented within a frame defined by a word clock signal, causes the word to lose all meaning.

The random nature of data shift can be appreciated by referring to FIG. 3. Shifts in the nominal position of a data transition edge due to timing fluctuations result in a normal distribution of possible transition edges distributed with respect to time around the occurrence of the bit clock timing edge. If the bit clock period is used to define the code bit cell boundaries, there would be an approximately 50% probability that a transition edge, representing a transition from 1 to 0, or 0 to 1, would be shifted early or late and therefore not captured in the proper code bit cell, giving rise to a data word error. A code bit cell should properly have its boundaries symmetric about the mean of an expected data value. However, because of a multiplicity of reference clock signals provided in prior art-type transmission systems, bit cell boundaries must be inordinately wide in order to accommodate the expected transition edge distribution pattern. Widening the bit period necessarily requires that a system bandwidth be consequently reduced, reflecting a loss of transmission capability. Accordingly, some other means must be provided to ensure that all of the component elements of a multi-port transmission system be at least frequency locked together, such that only phase recovery is necessary to correctly place the transition edges of a serial data stream within an appropriate code cell boundary.

The same reasoning holds true for word synchronizing a 2.125 GHz serial data stream. A word detection window (word clock) must be able to accommodate variations in its own frequency and phase in order to provide for accurate detection and capture of a data word from serial data running at slightly variable channel rates. If a word clock signal were to be bit-shifted by the same approximately 90 degrees in phase from the bit clock signal, the same type of data read error would occur as if the bit clock signal were shifted. Thus, it will be understood that in addition to having each of its component elements frequency-locked together, an effective high-speed data transmission system must also provide for a word clock signal which is frequency-locked to a bit clock. Moreover, the word clock signal must accurately define the beginning of a data word and, thus, must be consistent across all of the component elements of such a transmission system.

In addition, many prior art switches utilize a processing unit to determine a switch configuration and provide flow control signals for controlling the flow of information through the switch. The processing unit receives connection requests and transceiver status signals over a common data bus accessed by all transceivers connected to the switch. Thus, at any given time, transceivers are requesting access to the common data bus to place connection requests and to provide transceiver status signals, such as signals indicating that the transceiver is unable to accept additional data due to the transceivers input buffer being full.

The use of a common data bus and processor receiving information from a plurality of transceivers over the data bus may result in delays in data communications. That is, the data bus may not be accessible at any given instance due to the data bus already being in use by another transceiver. Accordingly, the system design must take into account delays due to use of a common data bus in determining when to transmit transceiver input buffer full status, and other signals, and additionally switch connections may be delayed due to delays in providing the processing unit the connection requests. Thus, the use of a processing unit and common data bus further decreases the bandwidth of the switch.

SUMMARY OF THE INVENTION

The present invention therefore provides a method and system for synchronizing data switching systems and providing low level flow control therein. According to the present invention a switching system is provided having a switch circuit and a transceiver circuit. The switch circuit includes a plurality of switch ports transmitting and receiving data and a switch fabric routing data among and between the switch ports. The switch circuit further includes a timing reference signal defining bit and word cell boundaries for data transmitted by each switch port. The transceiver circuits are linked to a switch port such that the transceiver circuits may transmit data to a switch port and receive data from a switch port. The transceiver circuits have means for recovering a timing signal and a word cell boundary from data received from the switch port. In addition, the transceiver circuit transmits data to the switch port, with the data transmitted to the switch port having bit and word cell boundaries defined by the timing signal.

In one embodiment of the invention, the timing signal is word frame aligned through use of an alignment generator circuit disposed in the switch and an alignment detector and generator circuit disposed in the transceiver circuit for detecting and defining alignment words defined by the alignment word generator in the switch. Further, the transceiver circuits append overhead bits to data words transmitted to the switch, the overhead bits providing transceiver status information, indications of command words, and increased data edge density. The switch appropriately routes overhead bits relating to transceiver status the corresponding transceivers in communication with the transceiver such that the corresponding transceivers are able to implement low level flow control measures.

DESCRIPTION OF THE DRAWINGS

These and other features, aspects and advantages of the present invention will be more fully understood when considered with regard to the following detailed description, appended claims and accompanying drawings wherein:

DETAILED DESCRIPTION

Figure 1:
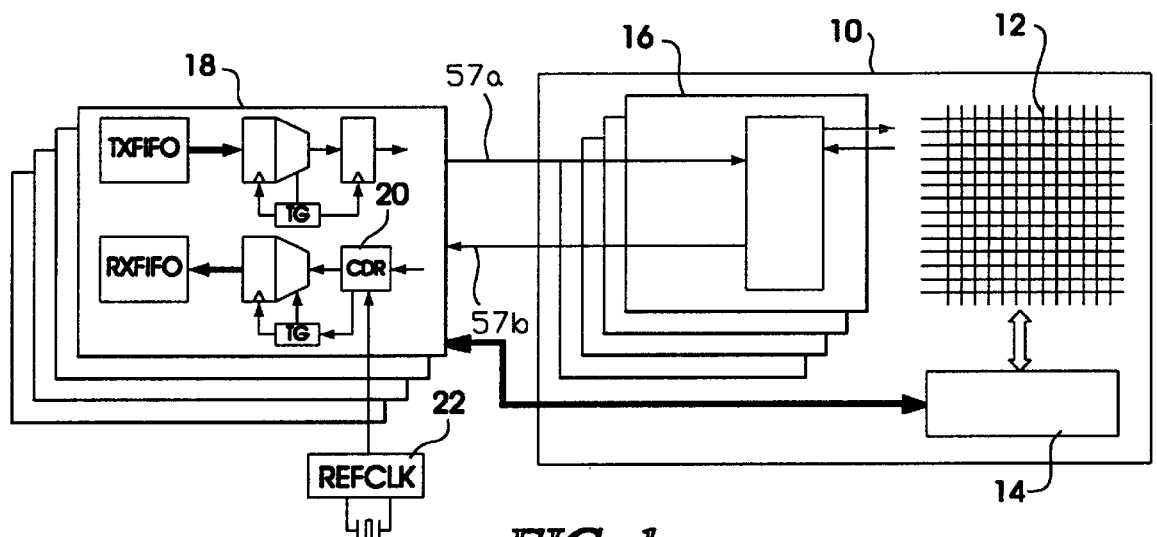
FIG. 1 is a semi-schematic block diagram of a prior art crosspoint switch and transceiver.
Figure 4:
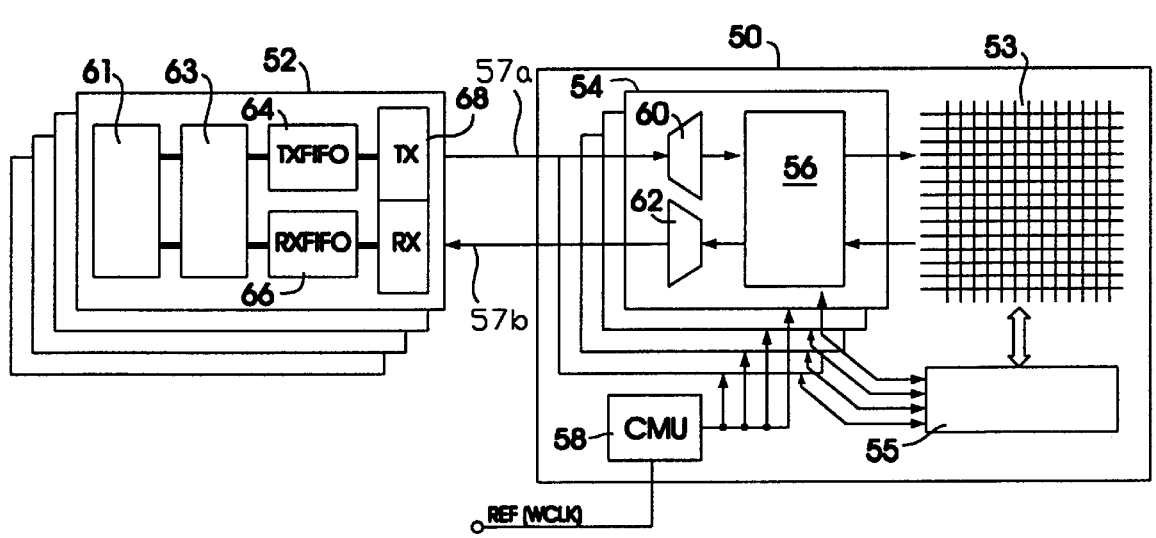
FIG. 4 is a semi-schematic block diagram of an embodiment of a multiplicity of high speed serial transceiver ports coupled to a cross-switch routing circuit of the present invention.
Figure 2:
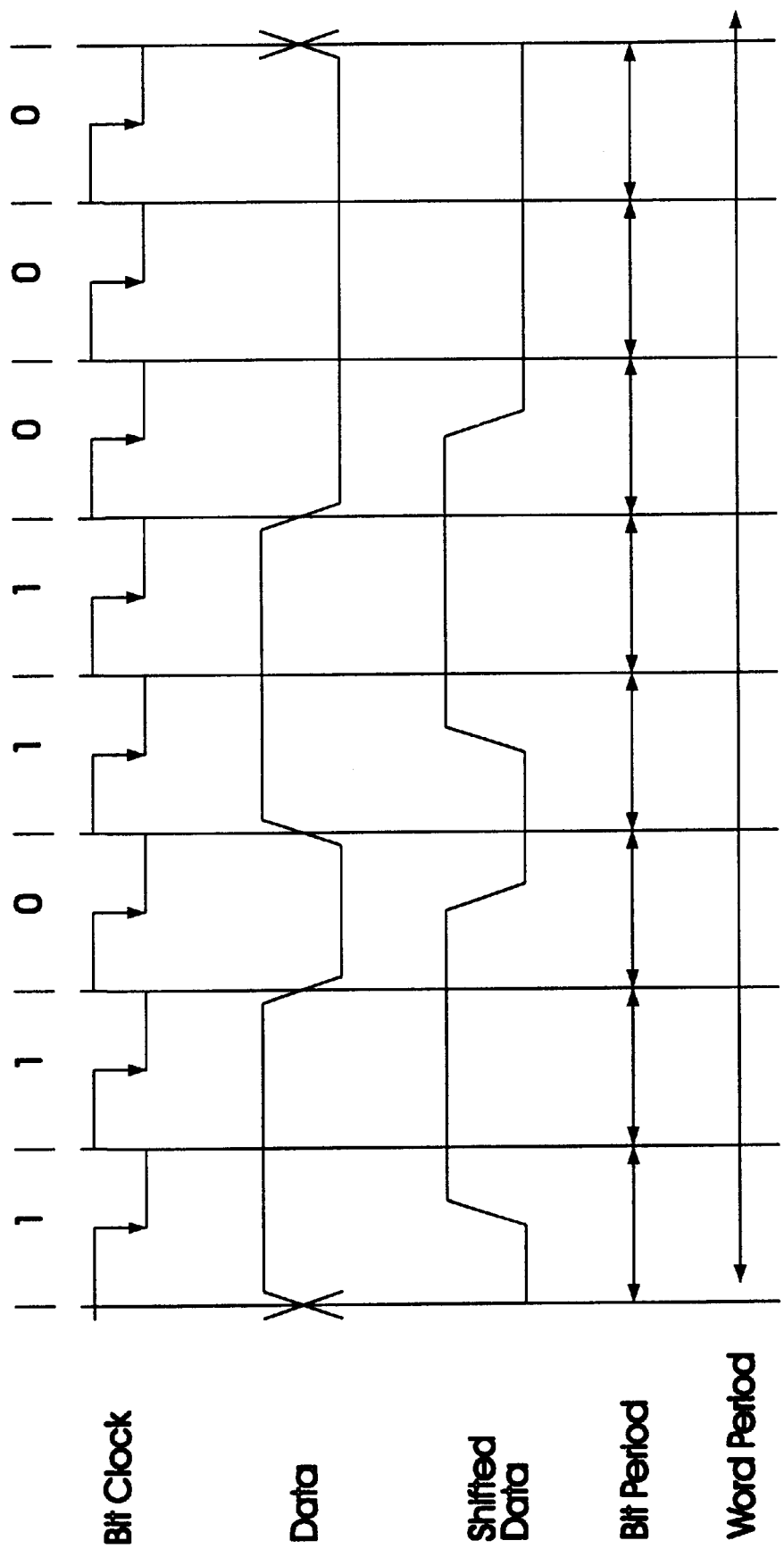
FIG. 2 illustrates a series of waveform diagrams showing the effects of timing error on a serial data stream.
Figure 3:
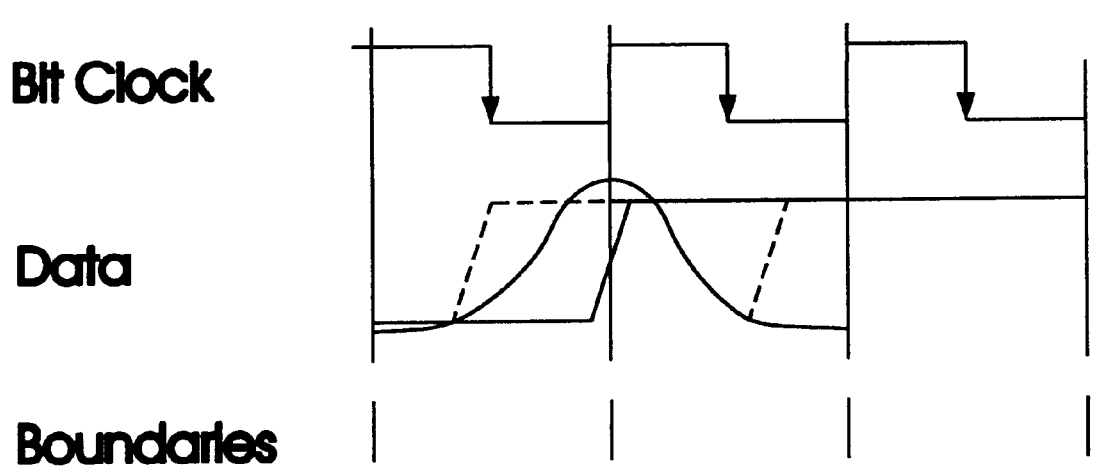
FIG. 3 illustrates the random nature of bit displacement and its effects on word alignment.

FIG. 4 illustrates a semi-schematic block diagram of a packet-based switching system of the present invention. The system includes a 16×16 synchronous serial crosspoint switch circuit 50. Up to 16 high speed serial transceiver port cards 52 (only four of which are shown) are connected to the crosspoint switch circuit by pairs of suitable transmission lines 57a, b. In the embodiment described the crosspoint switch circuit operates at an aggregate bandwidth of up to approximately 32 Gb/s. The crosspoint switch circuit unit 50 includes a conventional 16×16 crosspoint switch fabric 53 configured to provide sixteen connections from one side of the switch fabric to another side of the switch fabric on a selective basis. The fabric 53 is connected to receive serial data from, and send serial data to, 16 bi-directional switch ports, commonly indicated at 54. Each of the switch ports are in turn connected to transmit and receive serial data from a corresponding one of the port cards 52 over the transmission lines at a serial data rate of about 2.125 GHz. For purposes of clarity and for ease of explanation, only four of bi-directional switch ports 54 are shown in the embodiment of FIG. 4, but those having skill in the art will recognize how to expand the representations of both the switch ports 54 and the transceiver port cards 52 so as to accommodate a 16×16 switch fabric. Implementations of crosspoint switch matrixes or fabrics are well known in the art, and therefore the switch matrix or fabric 53 crosspoint switch (or cross-switch router) requires no further elaboration herein. It is sufficient to mention that the switch matrix or fabric is a 16×16 matrix which receives incoming serial data from a selected one of the port cards 52 and routes the serial data to an appropriate recipient port card, designated as the addressee in a data packet header at the incoming serial data. Further, other switches, such as a Delta switch, may be used in place of the crosspoint switch of the embodiment of FIG. 4.

An arbitration logic and switch control circuit 55 determines the configuration of the crosspoint switch fabric 53. The switch control circuit communicates with logic circuitry 56 incorporated into each of the switch ports 54 in order to ensure that the data received from the transmitter is directed to a correct designated recipient. The switch control circuit implements a round robin arbitration scheme for allocating switch connection requests. Circuits for implementing round robin arbitration schemes are known in the art. Alternatively, the arbitration logic and switch control circuit could maintain a record of all switching and routing transactions in a port connection table, and thereby identify sender/recipient pairs and keep track of available connections through the switch fabric.

As will be developed more fully below, routing, or connection, requests (CRQs) are made by a transmitting port to the arbitration logic and switch control circuit 55, which appropriately configures the matrix 53. The logic circuitry 56 additionally provides the switch control circuit connection requests overhead bits to effect flow control of data transmitted through the switch.

A global, system wide clock signal is provided on the switch circuit unit 50 and defines a global word clock (WCLK) signal, which is a 62.5 MHz signal in the described embodiment. A synchronized bit clock timing signal is developed through a CMU circuit 58 using the word clock signal, with the bit clock timing signal being a 2.125 GHz signal in the described embodiment. The WCLK signal is provided by an external 62.5 MHz crystal oscillator, which is coupled to the switch circuit in conventional fashion, but some other suitable reference clock generation circuit may also be used. The bit clock timing signal is directed, globally, to each of the bi-directional switch ports 54 comprising the switch circuit unit 50. Defining the bit clock timing signal for each of the switch ports from a single input reference clock signal (WCLK) has important implications to the synchronous bi-directional data transmission characteristics of the system. Since each of the switch ports operate off of a unitary timing signal developed from a single timing reference, it will be understood that each of the switch ports 54 will operate in a synchronous, albeit possibly phase shifted, fashion with the others.

Each switch port 54 comprises a receiver section including a serial-to-parallel data converter 60 (also referred to as a deserializer or DMUX). The DMUX is configured to receive a serial data stream transmission from the transmitter section of a corresponding transceiver port card 52 and convert the serial data into a parallel data word (referred to herein as a transmission character). In the embodiment described, the serial-to-parallel converter 60 receives incoming data transmissions at a 2.125 Gb/s data rate and outputs a 34-bit transmission character comprising a 32-bit data word, plus two overhead bits, at a parallel data rate of about 62.5 MHz.

Similarly, each switch port 54 comprises a transmitter section including parallel-to-serial data converter 62 (also referred to as a serializer or MUX) which performs a similar function to the serializer 60, but in reverse. The parallel-to-serial converter 62 receives a 34-bit transmission character (a 32-bit data word, plus two overhead bits) which has been routed to the corresponding switch port through the switch fabric 53 at an input parallel data rate of approximately 62.5 MHz. The parallel-to-serial converter converts the parallel data into a serial data stream suitable for transmission to a receiver portion of the port card 52 at a serial data rate of approximately 2.125 Gb/s. Thus, the 62.5 MHz WCLK signal, distributed by the CMU clock circuit 58, is used as a master strobe to clock 34-bit parallel data out of the serial-to-parallel converter 60 to the port logic circuit 56. The WCLK signal is also used to clock 34-bit parallel data from the port logic circuit 56 into the parallel to serial converter 62. All timing signals, whether serial bit timing signals or parallel word timing signals, used by each of the switch ports, therefore, is developed by the CMU clock circuit 58 in response to the system wide reference WCLK.

Each of the transceiver port cards 52 are typically constructed to include a mix or combination of transceiver circuitry and circuitry related to a particular user's application. In a typical configuration, a transceiver port card includes physical layer circuitry 61, 63 for a given communication protocol, and data buffer circuitry that manages the information flow and formatting between downstream user application circuitry and the transceiver. In the embodiment of FIG. 4, the data buffer circuitry comprises transmit and receive FIFOs 64 and 66, respectively. The transmit and receive FIFOs are each coupled to the transceiver circuitry over a parallel data interface. In the embodiment described, data is clocked to the transceiver at the 62.5 Mb/s parallel data rate.

In many communications applications, however, the parallel data interface to the transmit and receive FIFOs will operate at a different frequency than the 62.5 MHz word clock used by the switch card and the transceiver port card's transmit and receive circuitry. In this case, the transmit and receive FIFOs 64 and 66 are implemented as synchronous, dual port FIFOS, whose dual clock ports are used to elastically span any discontinuous clock boundaries between the transmission side and the media side. In addition, the transmit and receive FIFOs are made large enough to function as data queues or data buffers for each port card's transceiver circuitry. The transmit and receive FIFOs may be implemented as register stacks, string buffers, and the like, but are preferably implemented as dual-port, parallel data buffer, integrated circuit memory elements. Suitable transmit and receive FIFOs 64 and 66 include FIFO devices able to operate at speeds up to 67 MHz. Such a FIFO is exemplified by the IDT7236 series of synchronous FIFOs, manufactured and sold by Integrated Device Technology, among others.

Each transceiver port circuity 68 comprises a transmitter section, indicated as TX, and a receiver section, indicated as RX. The transmitter section includes a serializer (not shown in the embodiment of FIG. 4) for converting 62.5 Mb/s parallel data from the transmit FIFO 64 into a serial data stream suitable for transmission to the receiver section of a corresponding switch port. Likewise, the receiver section incorporates a serial-to-parallel converter (also not shown) for converting a high speed serial data stream, from the transmitter section of the corresponding switch port, into 62.5 MHz parallel data suitable for receipt and storage by the receive FIFO 66. The serial interconnect between a transceiver port circuitry 68 and the corresponding switch port of switch circuit card 60 is a bi-directional serial interface and operates to transmit and receive high-speed, serial data signals at 2.125 Gb/s. In a manner that will be described in greater detail below, the serial data streams communicated between a transceiver port and a switch port, and the parallel data communicated between a transceiver port circuitry 68 and its associated FIFOs 64 and 66, are bit and word synchronized to the bit and word timing signals used to strobe serial and parallel data by the timing elements of the switch card 50.

The transceiver bit clock (i.e., the timing signals used to define the bit or cell period of serial data) is recovered from an incoming serial data stream provided to the transceiver port's receiver section by the switch port 54. Recovered bit clock strobe transitions are also used to clock an outgoing serial data stream from the transmitter to a corresponding switch port 54. Accordingly, the serial data stream provided to the switch port 54 by the transceiver 68 will be at the same frequency as the bit clock of the switch port, and need only have its phase evaluated in order to ensure proper bit phase alignment because the switch card 50 defines the timing parameters of a serial data stream directed to the transceiver port circuitry 68.

Figure 5A:
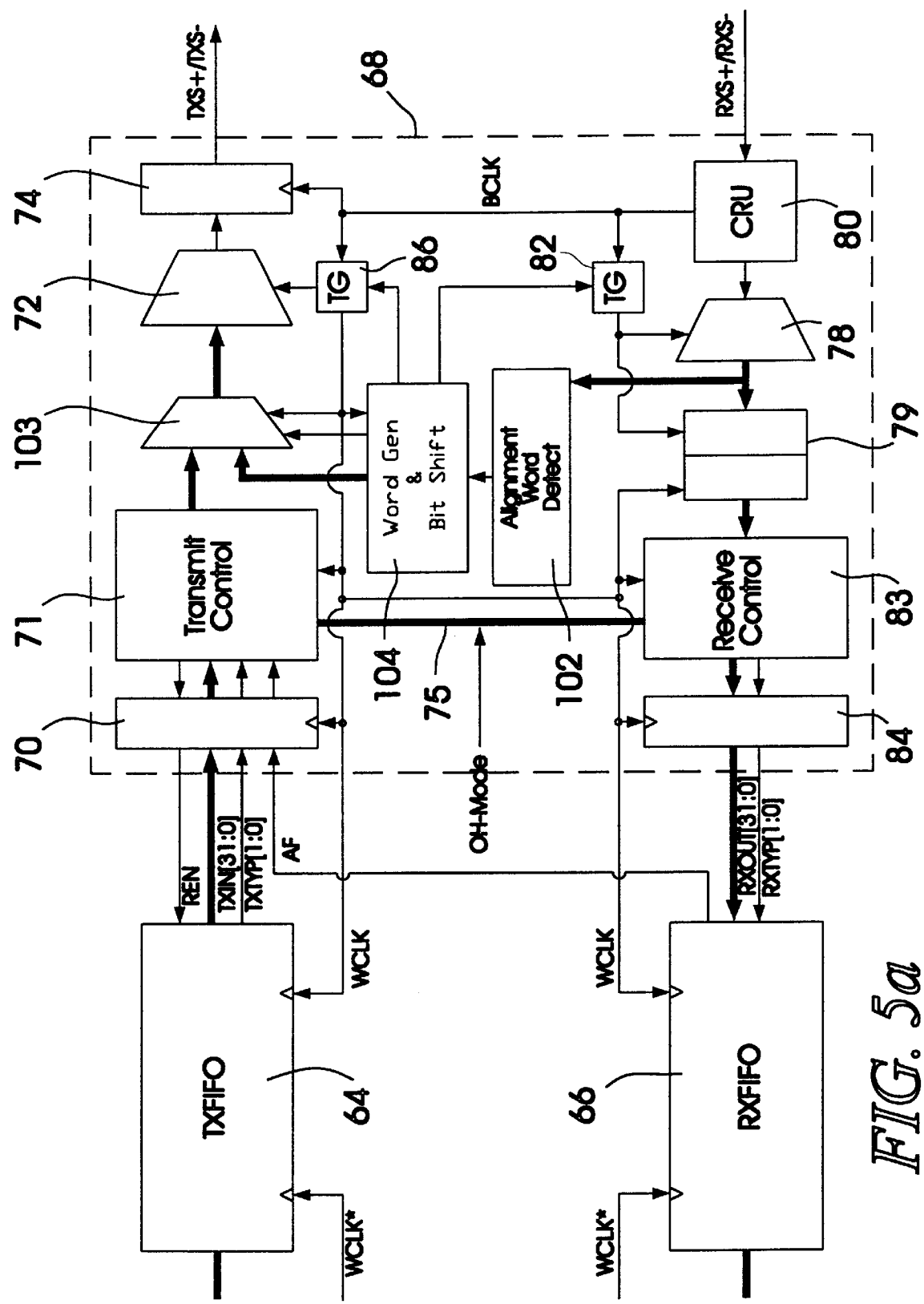
FIG. 5a is a semi-schematic block diagram of the transceiver circuit of FIG. 4 incorporating circuitry for bit and word synchronization.
Figure 5B:
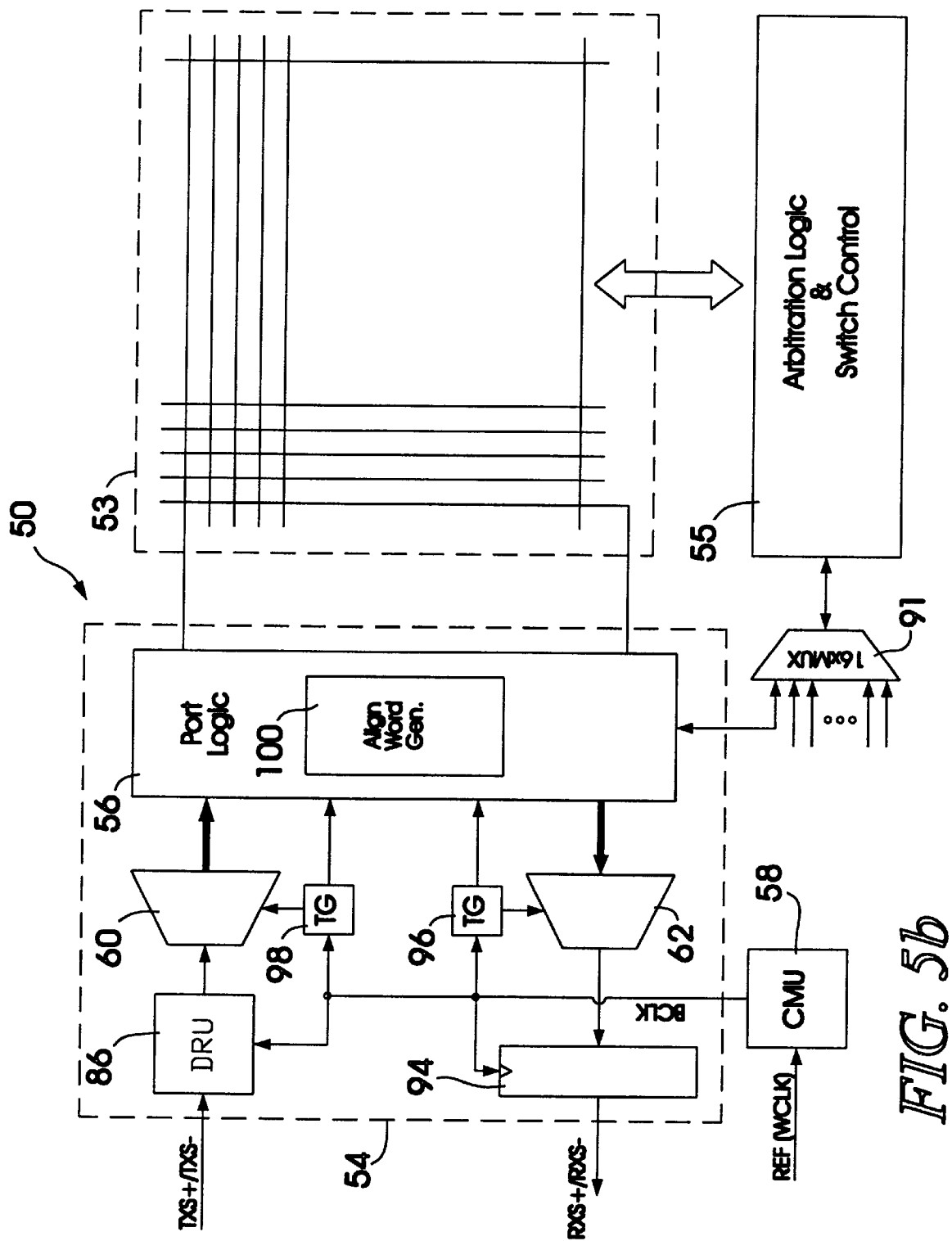
FIG. 5b is a semi-schematic block diagram of the switch circuit of FIG. 4 incorporating circuitry for developing a global clock domain for bit and word synchronization.

Referring now to FIGS. 5a and 5b, there is shown a semi-schematic block diagram of an embodiment of a transceiver port circuitry 68 coupled to a corresponding switch port 54 of a switch card over a bi-directional 2.125 Gb/s differential serial data link. The transceiver circuit is illustrated in FIG. 5a, while the corresponding switch port and switch unit circuitry is illustrated in FIG. 5b. As is the case with the embodiment illustrated in FIG. 4, the transceiver port circuitry 68 is connected to transmit and receive FIFOs, 64 and 66 respectively, over 62.5 MHz parallel data interface busses adapted to communicate parallel data between the transceiver port circuitry 68 and the FIFOs. The data interface connection from the transmit FIFO 64 comprises a 32-bit parallel transmission data bus TXIN[31:0], which is clocked into the transceiver on a transition edge of the transceiver master word clock timing signal WCLK. As will be later discussed, the transceiver develops two word clocks, a transceiver transmit word clock and a transceiver receive word clock. In order to increase the ease of interfacing with the transceiver, the transceiver transmit word clock is designated as the transceiver master word clock.

A 2-bit transmission type signal TXTYP[1:0] is also provided on the parallel interface and, if the transceiver is put into a first configuration, defines the type of data word being transmitted. On the other hand, as will be described below, if the transceiver is put into a second configuration, the TXTYP[1:0] signals directly control the configuration of two overhead bits appended to a command or data word in the MSB positions. The two overhead bits function to define flow control signals in the second configuration.

The data interface connection between the transceiver and the receive FIFO 66 is a 32-bit parallel receive data bus RXOUT[31:0]. The receive data bus is clocked out of the transceiver on a transition edge of the transceiver master WCLK timing signal. A two bit receive word type signal RXTYP[1:0] is also provided on the parallel interface. The receive word type signal defines the type of data word being received if the transceiver is put into the first configuration. If the transceiver is put into a second configuration, however, the RXTYP[1:0] signal reflects the configuration of two overhead bits appended to a command or data word and received over the serial channel of the transceiver.

In addition to these parallel signal busses, both the transmit FIFO 64 and receive FIFO 66 host numerous command and control signals, several of which are coupled to the transceiver circuit and several of which are coupled to application control circuitry (63 of FIG. 4). Those having skill in the art will easily recognize how to make suitable configuration connections between the transceiver and a respective FIFO. Therefore, it is not considered necessary to give a detailed description of each and every signal connection herein.

Two signal connections, however, should be described in order to gain a more complete understanding of the construction and operation of the transceiver port circuitry 68. An almost full indication signal AF is conventionally asserted by the receive FIFO 66 when the number of empty memory locations is less than, or equal to, a preprogrammed value. Such a condition occurs if data is being written to the FIFO at a rate faster than the FIFO is being read at the media side. Likewise, a read enable signal REN is conventionally asserted to the transmit FIFO 64, and indicates that a receiving device is ready to receive data. In the embodiment of FIGS. 5a and 5b, the AF and REN signals are coupled to the transceiver, with the transceiver receiving AF from the receive FIFO and asserting REN to the transmit FIFO. The transceiver utilizes the AF and REN signals in configuring two overhead bits appended to data words transmitted to the switch. The two overhead bits are used to indicate, among other items, whether the port card receive FIFO buffer has sufficient available space to receive additional data. The overhead bits, therefore, are routed from a receiving transceiver to a transmitting receiver through a reverse crosspoint switch implemented on the switch, in a manner more fully later described.

Referring now to FIG. 5b, the switch port 54 is connected to a switch matrix or fabric 53. The switch fabric is adapted to route data transmissions, received from a particular transceiver port, to a designated switch port and thence to its corresponding intended recipient transceiver port. This is done under the operational control of an arbitration logic and switch control circuit 55. As referred to previously in the embodiment of FIG. 4, the switch matrix or fabric 53 is conventional in implementation and design, and need not be further described herein. It should be noted, however, that unlike conventional switches implementing a switch fabric, the arbitration logic and switch control circuitry 55 is not implemented as a conventional central control processor. However, a control processor may be used with various aspects of the present invention.

Further, flow control decisions are not delayed by using data provided by the transceivers and routed to a conventional central control processor using a dedicated data bus. Instead, overhead bits are sent through essentially a reverse crosspoint switch and appended to the 32-bit data packet (thereby defining a 34-bit transmission character) and used to directly control the flow of information from a transmitter to a receiver, as well as provide other information.

Turning now to the transceiver port circuitry 68 of FIG. 5a, the transceiver can be viewed as comprising two parts, a transmitter section and a receiver section. When the transceiver is in transmit mode, a 32-bit data word TXIN [31:0] and a 2-bit transmission type word TXTYP[1:0], are clocked out of the transmit FIFO 64 and into a synchronizing parallel input buffer register 70 in accord with 62.5 MHz clock rate.

Parallel data is clocked out of the buffer register 70 and into a transmit control logic circuit 71. Transmit control logic circuit 71 is responsible for asserting transmission state signals to the transmit FIFO. Such state signals include indications that data packets have been successfully transmitted to all outputs, a beginning-of-packet indication, a retransmission required indication, and the like. Also, transmit control logic 71 is responsible for adaptively reconfiguring TXTYP[1:0] information into a 2-bit flow control overhead bit field when the transceiver is configured to operate in a particular communication mode, designated "overhead-mode" herein. An overhead-mode signal, OH-MODE, is a user programmable state signal, externally sourced, and coupled to the transmit control logic circuitry 71 over an internal communication bus 75.

In any communication mode, the transmit control logic 71 combines the 32-bit data TXIN[31:0] with either the 2-bit TXTTYP[1:0] or a 2-bit flow control overhead bit field, into a 34-bit data string, the 34-bit data string comprises a transmission word or transmission character. The 34-bit wide transmission characters are serialized by a parallel-to-serial converter 72 (also referred to as a serializer or MUX) and provided to a 2.125 GHz serial output buffer 74. Serialized data is clocked out of the transceiver 68 as a differential signal TXS+/TXS− over a high speed serial transmission line to the input of a corresponding switch port 54. The serial output buffer 74 is clocked by a 2.125 GHz bit clock signal which is, in turn, directly developed by the CRU from an incoming serial data stream sent by the switch port 54. The bit clock signal, BCLK, is a 2.125 GHz strobe which defines the bit cell boundaries of the desired serial data stream. The BCLK signal is directed through a timing generator 86 which comprises divide-by-34 circuitry, such that the 2.125 GHz BCLK signal is divided down to the 62.5 MHz transceiver transmit word clock signal, which is also the transceiver master word clock WCLK signal, in synchronous fashion. Thus, it will be understood that the word boundaries of WCLK and, thus, each 34-bit wide transmission character, will correspond to and be synchronous with every 34th strobe transition edge of the BCLK signal.

On the receiver side, a high speed serial transmission line is coupled between a high speed output of the switch port 54 and the receiver input of the transceiver circuit 68. The transmission line is configured to provide a differential, serial data stream RXS+/RXS− to the transceiver 68 at a 2.125 Gb/s data rate. The receiver input is coupled to a deserializer, or serial-to-parallel converter 78 which suitably converts the 2.125 GHz serial data stream into 62.5 MHz 34-bit wide parallel transmission characters.

Serial data is transmitted by the switch port 54 for retrieval by the transceiver circuit 68 without any additional timing reference signals added thereto. A serial stream of data flows over the transmission line with no accompanying clock information. However, the deserializer 78 must process the serial data stream synchronously, such that the resulting 34-bit wide parallel transmission characters are correctly aligned on the appropriate word boundaries. Thus, timing information, i.e., a clock signal, is recovered directly from the serial data stream by a clock recovery unit (CRU) 80. The CRU 80 is a phase and frequency sensitive clock recovery circuit, such as a high-speed phase locked loop (PLL). PLL circuitry suitable for extracting a 2.125 GHz BCLK signal from a 2.125 Gb/s data stream are common circuits implemented in high speed transceiver applications and are well understood by those having skill in the art. Accordingly, it is considered unnecessary to go into detail regarding their construction and operation herein. It is sufficient that CRU 80 is able to recover a bit clock signal BCLK from a serial data stream provided by the switch port 54, and that the recovered BCLK signal is frequency-locked to the frequency of the serial data stream transmitted by the switch port.

The recovered clock signal, BCLK, is directed through a divide-by-34 timing generator 82 which provides a 62.5 MHz transceiver receive word clock signal to the deserializer 78 and input side of retiming bank 79. The output side of the retiming bank receives the transceiver master word clock signal WCLK, as do receive control logic circuitry 83, a parallel output buffer register 84 and a receiver FIFO 66, from whence received transmission characters are directed to follow-on customer application circuitry over a parallel data interconnect bus. It should be noted that the 62.5 MHz WCLK signal provided to the receive control logic 83, the parallel output buffer 84 and the receiver FIFO 66 is in phase and frequency alignment with the WCLK signal directed to the serializer 72, the parallel input buffer 70 and the transmit FIFO 64, since all of these timing signals derive from the same source, i.e., the timing information recovered from a serial data stream by the CRU 80. In addition, both the transceiver receive and transmit word clock signals are the same frequency as word clock the bit clock signals (BCLK), developed by the CRU 80, and the incoming serial data stream transmitted by the switch port 54. Because of this relationship between all of the timing signals developed in both the switch port 54 and a corresponding transceiver 68, as well as the bi-directional data transmissions, it will be understood that the switch circuit 50, its composite switch ports 54, and all of their associated transceiver circuits, are frequency-locked to a single clock source, which is developed by a local CMU 89 on the switch card 50, in operational response to a single external timing reference signal.

Turning now to the switch port 54 illustrated in FIG. 5*b*, differential, high speed serial data is received from the transceiver's serial output buffer 74 (shown in FIG. 5*a*) and provided to a data recovery unit (DRU) 86. Because the serial data stream has been clocked out of the transceiver by a BCLK signal which is frequency-locked to the global system clock, the DRU 86 need only be implemented to evaluate the phase of the incoming serial data stream. Frequency lock is maintained by running the DRU 86 off of a BCLK signal directed to the DRU by the CMU 58 which is suitably constructed to multiply a global input, 62.5 MHz WCLK signal by a factor of 34, in order to define a 2.125 GHz BCLK signal suitable for bit clocking operations. The local CMU 58 assists the DRU 86 in obtaining and maintaining frequency lock, such that the DRU need only phase lock to the incoming serial data stream.

Phase-locked serial data is provided by the DRU 86 to the deserializer 60 which converts the serial data stream into a 34-bit wide parallel transmission character suitable for processing by port logic circuitry 56. The 34-bit wide parallel transmission character is processed by the port logic circuitry 56 in order to determine the intended recipient of the data packet and appropriate switch configuration and connection requests are forwarded to the arbitration logic and switch control circuitry 55, requesting that the switch fabric 53 be configured appropriately. Data traversing the switch fabric 53 towards an intended recipient, is directed into the port logic circuit 56 of the appropriate recipient switch port. Port logic circuitry transfers the 34-bit wide parallel transmission character to the serializer 62 which converts the 62.5 MHz parallel signal into a 2.125 Gb/s serial data stream which is, in turn, clocked out of the switch port through a serial output buffer 94.

It will be seen from FIG. 5*b*, that timing information for both the serializer 62 and deserializer 60 is developed through respective timing generators 96 and 98, each responsive to the 2.125 GHz BCLK signal developed by the CMU 58. In addition, the serial output buffer 94 clocks the serial data onto the transmission line and, thence, to the receiver input of the transceiver port circuitry 68 (shown in FIG. 5*a*), in accordance with a BCLK timing strobe. Thus, it will be seen that the output timing of the serial data stream is defined by a bit clock signal (BCLK) developed by the CMU 58 from a master system clock signal (WCLK). This same bit clock signal (BCLK) is used to frequency-lock the switch port's data recovery unit 86 to an incoming data stream. Therefore the switch port's inputs and outputs are strobed at identical frequencies and the timing boundaries of data received and transmitted are separated only by a transmission line length induced phase shift. Similarly, the BCLK signal which defines the serial data stream frequency is recovered by the clock recovery unit 80 of the transceiver port circuitry 68. The rearward signal is used to define an analog BCLK signal, identical in frequency to the switch port's BCLK frequency, and which is used to strobe the transceiver's serial output buffer 74, thereby defining the frequency of the serial data stream directed to the switch port 54.

In other words, the embodiment of FIGS. 5*a* and 5*b* can be viewed in terms of a transmit/receive clock feedback loop, with the switch port 54 defining a bit cell or bit period clock (BCLK) and using BCLK to define the frequency of a serial data stream directed to a transceiver. The transceiver, in turn, recovers BCLK from the incoming serial data stream and uses this recovered clock to serialize and transmit its serial data streams directed to the switch port 54. Therefore, the serial data stream directed to the input of the switch port is necessarily at the same frequency as the switch port's bit clock (BCLK) and need only be phase-adjusted to accommodate any transmission line length induced phase shift. The present system only requires the serial data streams are encoded to ensure an approximate 15% edge transition density. Moreover, the overhead bits further provide, during much of normal transmission periods, additional edge transitions and thereby increase edge transition density. So long as the serial data stream has the appropriate edge transition density, the system comprising the master system clock (WCLK), in combination with the switch port's CMU 58 and DRU 86, provide a means for ensuring frequency lock and bit alignment between and among a multiplicity of switch ports 54 coupled to a corresponding multiplicity of transceivers 52. This is without regard to variable delays developed through the switch fabric 53 as the fabric changes its switch configuration in response to routing requests, and without the need for a transceiver 68 to burn valuable bandwidth realigning itself to the phase of a new incoming serial data stream.

Notwithstanding the inherent bit alignment characteristics of the system according to the present invention, it is nevertheless necessary to also provide for some means to word synchronize the information communicated between transceiver 52 and the switch port 54. Even though the transceiver 52 and switch port 54 are frequency-locked together, the transmit and receive data streams may be out of word alignment, with resultant loss of transmission character content. Accordingly, word (or frame) alignment must be established and maintained throughout serial data transmission. To recover word timing, the switch circuit 50 issues particular, pre-defined alignment words to each of the transceivers 68 during transmission link initialization and handshake protocol establishment.

Figure 6:
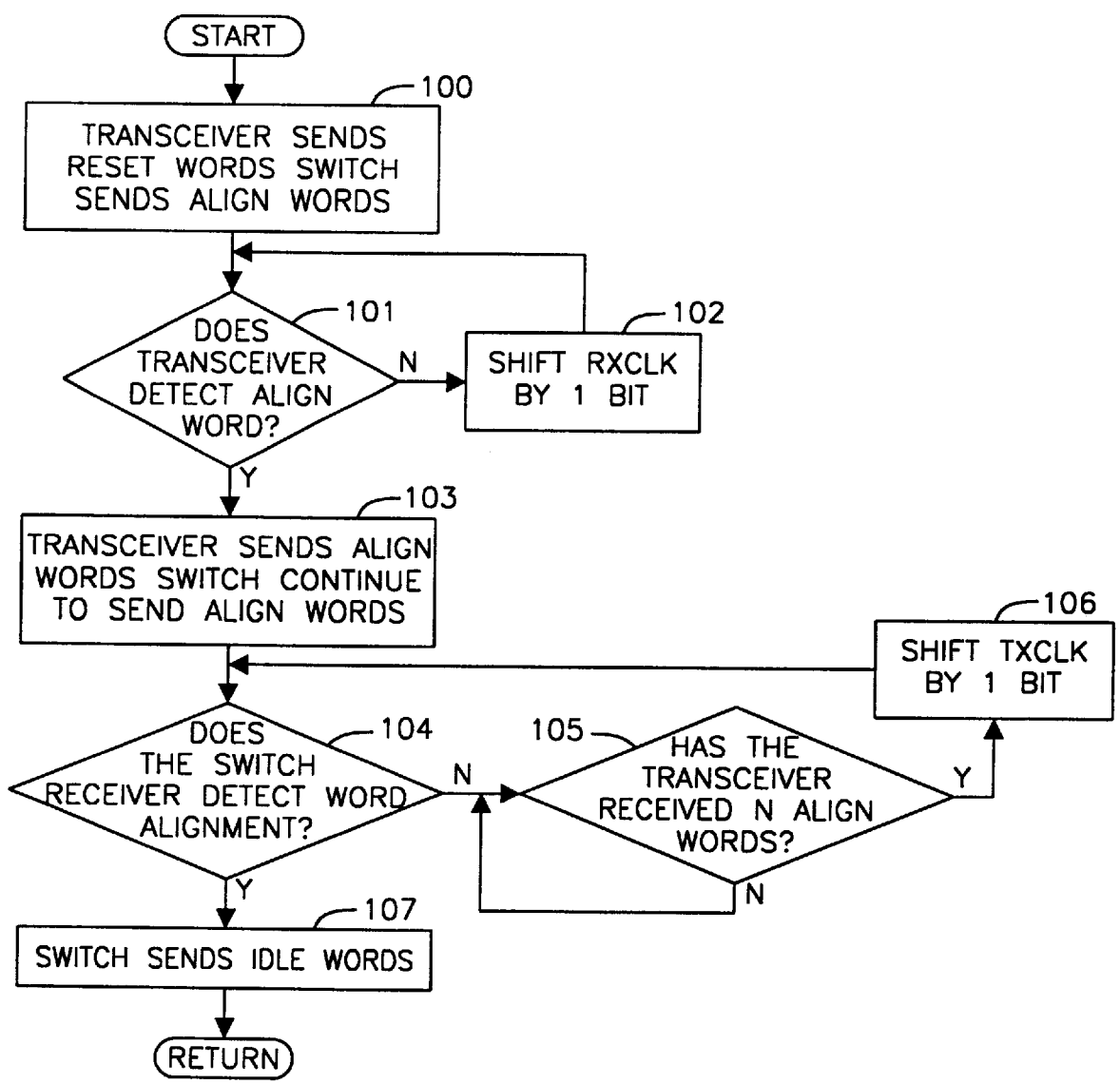
FIG. 6 is a flow diagram illustrating a word synchronization process of the present invention.

Referring now to FIGS. 5*a* and 5*b*, and the flow charts of a word alignment and synchronization process illustrated in FIG. 6*a*, word timing synchronization is established between a switch port and its associated transceiver port by an adaptive feed-back process. In the adaptive feed-back process a predefined alignment word transmitted by the switch are used by the transceivers to establish a transmitter receive word clock. The transceiver then transmits alignment words to the switch, with the switch then comparing the alignment word to an expected alignment word. The switch continues to issue alignment words in the event that the alignment word does not match with the transceiver shifting its transmitted alignment word in bit-by-bit fashion until the transceiver is word synchronized to the switch.

A flow chart of the word alignment process is illustrated in FIG. 6A. The word alignment process occurs upon power up, reset, or link initialization. The word alignment process executes independently for each transceiver. The word alignment process, therefore, may execute in parallel for any number of transceivers. In step 100 of the word alignment process the transceiver transmits at least one reset word to the switch. The reset word, comprising all logic "ones" in the described embodiment, requests that the switch begin the initialization and word synchronization process. The receipt of a reset word by the switch causes the switch to transmit alignment words to the transceiver. Alignment words are generated in Step 120 by an alignment word generator and comparator 100 comprising a portion of the port logic circuitry 56. In the embodiment presently described, upon receipt of the reset word, the port logic circuitry 90 causes the alignment word generator and comparator circuit 100 to sequentially generally output alignment words through the serializer 92 and serial output buffer 94. The alignment words are transmitted to the receiver input of the corresponding transceiver port circuitry 68. Alignment words include no inherent data content and so may be devised to contain any form of binary information. Preferably, alignment words are encoded such that the word (frame) boundaries can be easily determined by the alignment word generator and comparator circuit 100. Such an encoding scheme may be implemented in an alignment word comprising a "1" in the LSB and MSB positions of the word, with the remaining bit cells comprising a "0" string, i.e., 10000001, using an 8-bit word as an example. Other bit patterns with increased edge density, such as 10101011, may also be used.

In step 101 the process determines if the transceiver detects the alignment word. The transceiver circuitry which accomplishes this deserializes alignment words using the deserializer 78 and uses an alignment detector circuit 102, coupled to "snoop" the parallel bus coupled between the deserializer 78 and the transceiver's retiming register bank.

If the alignment detector does not detect the correct alignment word the alignment detector provides a signal to the receive word clock timing generator to shift the receive word clock by one bit in step 102. Examination of the received alignment words and, if necessary, the shifting of the receive word clock continues until the alignment detector detects the correct alignment word. Once the receive word clock is correctly aligned, the transceiver begins transmitting alignment words to the switch in step 103. The switch, using the alignment word generator and comparator circuit 100 compares the received alignment words to the expected alignment word in step 104. If the switch detects the correct alignment word the switch in step 107 issues IDLE word to the transceiver to signal that the transmitter is now word synchronized with the switch. The process then returns.

If the transceiver continues to receive alignment words, the alignment detection circuit 102 causes the frame generator and bit shifter to shift its transmit word boundary by one bit position after receipt of every 32 alignment words from the switch in steps 105 and 106. The process repeats until the alignment word generator and comparator circuit 100 in the switch determines that the alignment words sent by the transceiver are correctly framed in accordance with the switch word clock signal.

Bit and word alignment is accomplished only during link initialization. Since this process occurs relatively infrequently, the system of the present invention is not required to support fast phase acquisition and need only maintain frequency lock in the manner described above. Moreover, any small variation in phase of the signal received by the switch, whether due to component aging or temperature variations, is accounted for by the data recovery unit (DRU) of the switch circuitry. In addition, since a master reference clock is provided on the switch circuit, the system does not require transmission characters to incorporate additional overhead bits devised to absorb the types of bit loss that can occur with multiple reference clocks driving multiple transceivers, as is common in prior art implementations.

Although ensuring that the switch and all of its attendant transceiver circuits are bit and word synchronized, the synchronization method does require some means to ensure that both transmit and receive serial data streams contain sufficient signal edge transition density in order to maintain the established frequency lock. Given a preferred 15% edge transition density in a serial data stream, it will be understood that there need only be five transition edges incorporated in a 34-bit transmission character. Accordingly, only a few overhead bits are needed for each transmission character (word or frame) in order to maintain synchronization and frequency lock. Using this approach, the effective data bandwidth is reduced by only approximately 6%, as compared to a 20 to 40% bandwidth reduction in prior art systems. The higher bandwidth reduction is needed in prior art systems in order to guarantee that the data signal contains a sufficiently high transition rate for fast phase recovery.

As opposed to merely taking up transmission bandwidth, the overhead bits referred to above enable a particularly advantageous feature to be realized by the system. In contrast to the conventional prior art approach, which required all transceiver port data transmissions and connection requests to flow through a data bus to a single central control point, such as a control processor, the system implements flow control by changing the conventional meaning and function of the two overhead bits appended to the 32-bit data packet. The overhead bits appended to the 32-bit data packet are able to provide both low level flow control information and acknowledge and other information. The self-routing character switching and low level flow control architecture, as well as self-routing data switching, will now be described with reference to FIGS. 5a, 5b and FIG. 7.

Figure 7:
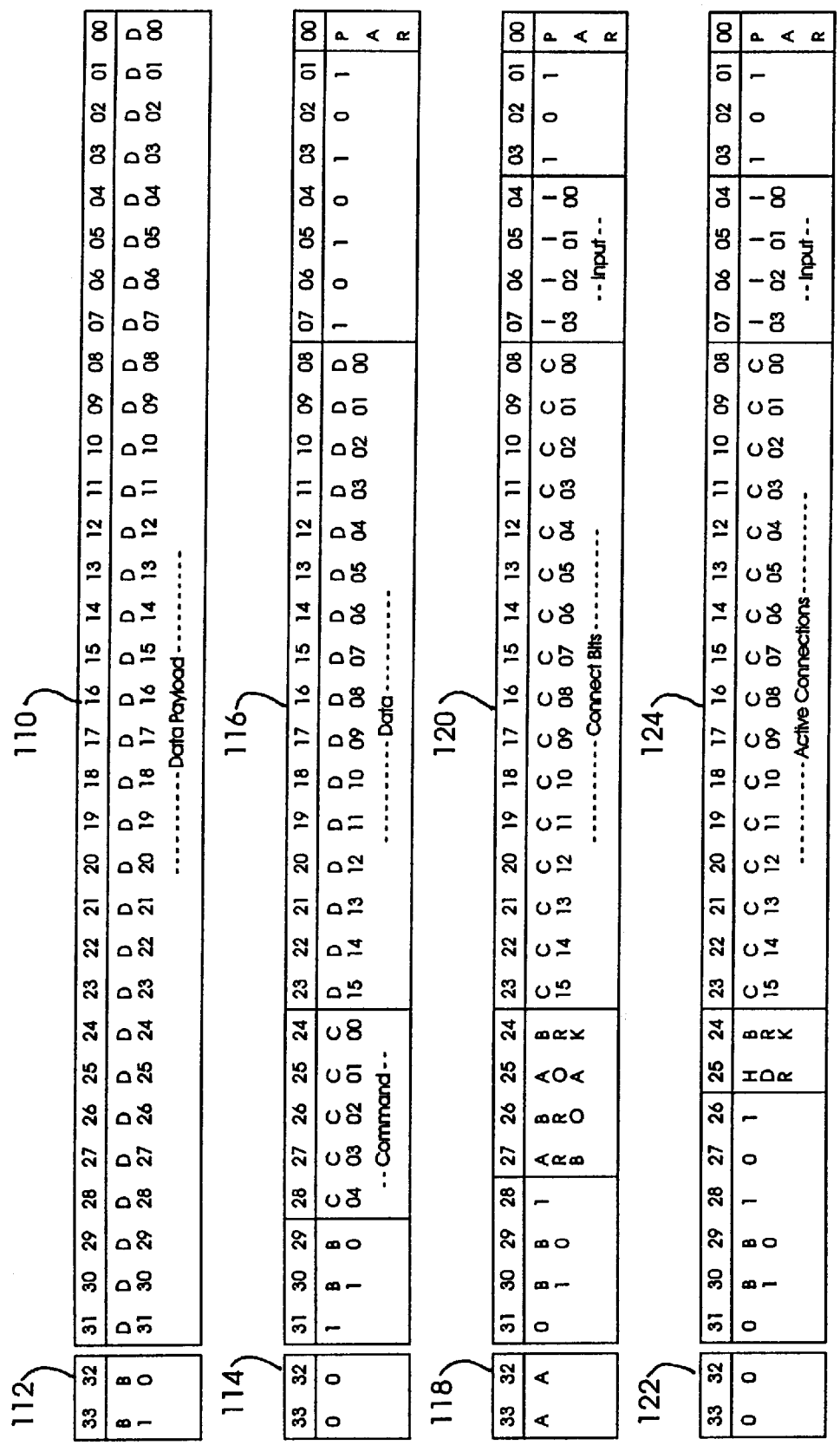
FIG. 7 illustrates command and data word formats for illustrating 34-bit transmission characters including two overhead bits for providing self-routing and low level flow control of the present invention.

With particular reference to FIG. 7, there is shown a number of 34-bit transmission characters, as those characters would appear at the TXS transmit output and the RXS receiver input of the transceiver circuit 68. A 34-bit transmission character including a 32-bit data word, a command word, a connection request (CRQ), such as would be sent by the transceiver to its corresponding switch port, and a connection request reply, such as would be sent by a switch port back to its corresponding transceiver are illustrated in FIG. 7.

The data word format is the format of a data word as it would be seen on the serial data lines spanning a transceiver and its corresponding switch port. The data word format is a 34-bit transmission character comprising a 32-bit data payload 110 and a 2-bit overhead field 112 appended thereto in the MSB positions. As was mentioned above, the 2-bit overhead field 112 has a conventional usage, whereby if the overhead mode (OH-MODE) signal, coupled to the transmit control circuit 71 and the receive control circuit 83, is in a first state, the overhead bits contained in the overhead field 112 identify the transmission signal's transmission type (TXTYP[1:0]), as well as identifying the receive signal's receive type (RXTYP[1:0]). In contrast, when the overhead mode (OH-MODE) signal is in a second state, the bit content of the overhead bit field 112 contains flow control channel information which is time-shared with the signaling between the switch and a transceiver for acknowledgment and response bits. The main application for this flow control channel is to prevent the receive FIFO of the receiving transceiver port from overflowing and, by using this flow control channel when the receive FIFO is almost full, transmitting transceiver port will be disabled from sending further data.

To provide self-routing and message passing functions, the transceiver and switch require different data types to differentiate between data words, connection request words, message words or command words. Depending on the state of the OH-MODE signal, and thus the mode that the transceiver is in, different data types are recognized by the transceiver. These data types at the transceiver/FIFO parallel interface are encoded in the TXTYP[1:0] or RXTYP[1:0] bits. The transmit control circuit 71 and receive control circuit 83 respectively encode these data types into the two over head bits B[1:0] or decode the two overhead bits B[1:0] for passage to the receive FIFO.

The command word format, as seen on the serial data lines at the output of the transceiver or the switch, comprises a 2-bit overhead field 114 appended to a 32-bit string 116 at the MSB positions. The overhead field 114 comprises two overhead bits (0,0) which are added by the transceiver or switch to designate a command word to the receiving switch or transceiver. The next three bit positions (from MSB to LSB) begin with a hard coded "1", followed by a pair of bits B[1:0] that are encoded to define an alignment word, one of two flow control channels or an acknowledge signal or link initialization reset signal. An additional 5-bit field C[4:0] is reserved for defining a command type and is used to identify alignment words, an IDLE signal, a RESET, signal, and the like. The command type field is followed by an optional 16-bit data payload field D[15:0], followed by an alternating pattern of "ones" and "zeros", terminating in a parity bit in the LSB position.

A connection request (CRQ) command word format as seen at the transceiver-to-switch interface includes an overhead bit field 118 appended to a 32-bit CRQ command word 120. The overhead bit field 118 comprises two overhead bits that are added by the transceiver's transmit control circuit 71 in order to designate either a CRQ word to the receiving switch, when the bits are configured (0,0) or to designate a header word for the next packet when the bits are configured (1,1). Similarly, a connection request as seen at the switch-to-transceiver interface includes an overhead field 122 appended to a CRQ command word 124. Two overhead bits are added by the switch in order to designate a command word to the transceiver when the bits are configured (0,0). This word is provided by the switch to the receiving port, when an ACK signal is asserted to the transmitting port, and functions as start-of-packet. The switch-to-transceiver CRQ word format contains the current active connections for the transmitting port in a 16-bit active connection field C[15:0].

Thus, in accordance with the invention, a command word can be used to send a connection request (CRQ) from a particular transceiver port to the switch matrix. An acknowledgment (ACK) to the request is returned from the switch to the requesting transceiver port by appending two overhead bits, configured (1,1) in either a command word's overhead field 114 or a data word's overhead field 112. Flow control channel information is also shared between a receiving transceiver port and a transmitting transceiver port by reconfiguring the two overhead bits comprising the overhead bit fields 112 and 114 of a data or command word. As will be described in greater detail below, a ready-to-received (RTR) configuration signal informs the transmitting transceiver port that there is sufficient room in the receiving transceiver port's receive FIFO and that it is appropriate to continue to transmit data. A not-ready-to-receive (NRTR) signal informs the transmitting transceiver port that the receiving transceiver port's receive FIFO is filling up and it is, therefore, not appropriate to continue sending data.

A ready-to-receive (RTR) signal is generated by configuring the overhead bits as (0,1) while a not-ready-to-receive (NRTR) signal is generating by configuring the overhead bits as (1,0). When the overhead bits are configured as (1,1), as indicated above, the overhead bits comprise an acknowledge (ACK) signal which is returned from the switch to a transceiver port which has made a connection request. It is the function of the switch, particularly the port logic 90 and arbitration logic and switch control circuit 55 to either generate the appropriate overhead bits (such as ACK) or to intercept flow control messages (such as RTR and NRTR) and re-direct them to the appropriate transceiver port so that effective flow control is maintained.

In order to better understand the utility of the overhead bits, it will be useful to consider how flow control overhead bits are generated by a transceiver in response to a FIFO almost full condition, and how flow control overhead bits are used in order to prevent further transmission. Referring now to FIGS. 5a and 5b, the receive FIFO 66 is conventionally provided with a signal line that indicates that the FIFO is in an almost full condition. The receive FIFO 66 can overflow if data arrives and is written to the FIFO faster than it can be read from the FIFO to the user's application circuit or physical media. In the example of FIG. 5a, the almost full signal AF from the receive FIFO 66 is coupled to the transceiver's input register 70 which passes the AF signal to the transceiver's transmit control circuit 71. The AF signal will be asserted when the number of empty FIFO locations is less than or equal to a value pre-programmed into the FIFO. This minimum value typically depends on the latency period between the time when the AF signal is asserted and when it is received at the transmitting transceiver. The latency period is such that 14+N more words are able to be transmitted, where N relates to a distance latency parameter and depends on the physical distance between the transceivers and the switch. It will be understood by those having skill in the art how to calculate the number of words that might be written into an almost full FIFO during a latency period and how to program this value into the FIFO such that AF is asserted at the proper time.

Transmit control circuit 71 receives the almost full indication and, if put into overhead mode by the appropriate OH-MODE signal, appends a not-ready-to-receive (NRTR) signal to a command or data word. As mentioned above, an NRTR signal is generated by configuring the overhead bits as (1,0). The command or data word including the NRTR signal is transmitted to the switch which recognizes the overhead bits as not comprising a conventional pattern and, in response, strips the NRTR signal from the command or data word and routes it to the appropriate transceiver for action. The overhead bits are recognized by the switch port's port logic circuit 56 which directs them to the switch's arbitration logic and switch control circuit 55 through its parallel bus connection through a plurality of 16 to 1 MUXes 91 (only one of which is shown for clarity). The 16 to 1 MUXes provide essentially the functions of a reverse crosspoint switch, which is how the described function is implemented in one embodiment. Arbitration logic and switch control circuit 55 recognizes which of the 16 switch ports provided the NRTR signal and, since it is in control of the configuration of the fabric 53, the arbitration logic and switch control circuit 55 understands which of the 16 switch ports is coupled to the transceiver which is transmitting data to the almost full recipient. Arbitration logic and switch control circuit 55 then provides the NRTR signal (1,0) to the appropriate switch port's port logic circuit 56 through MUX 91. That switch port's port logic circuit 56 appends the NRTR overhead bits to the next outgoing transmission to its corresponding transceiver 68.

In the transceiver port circuitry 68, the (1,0) overhead bits are directed to the receive control circuitry 83, as described above, which recognizes that the (1,0) overhead bit pattern represents a not-to-ready to receive condition and that the transceiver should cease transmitting. Receive control circuit 83 communicates with transmit control logic circuit 71 over the internal communication bus 75 and passes the overhead signal values to the transmit control logic circuit for command processing. In transmit control circuit, the received flow control signal is ANDed with a read enable signal, controlled by the transmit control logic. The resulting read enable signal REN is connected through the input register 70 to the transmit FIFO 64. When a not-to-ready to receive signal is ANDed with read enable, the resulting REN signal is de-asserted, instructing the transmit FIFO 64 that data reading is no longer enabled. Data transmission thereby ceases. Thus, the transceiver is only able to read a word from the transmit FIFO 64 if the flow control signal (the overhead bits) from the receiving transceiver are in a ready-to-receive (RTR) state. It should be noted, herein, that the switch is also able to independently assert and append an NRTR overhead pattern to any particular transmitting transceiver, in order to force an IDLE into the data stream to the transceiver whenever needed.

Figure 8:
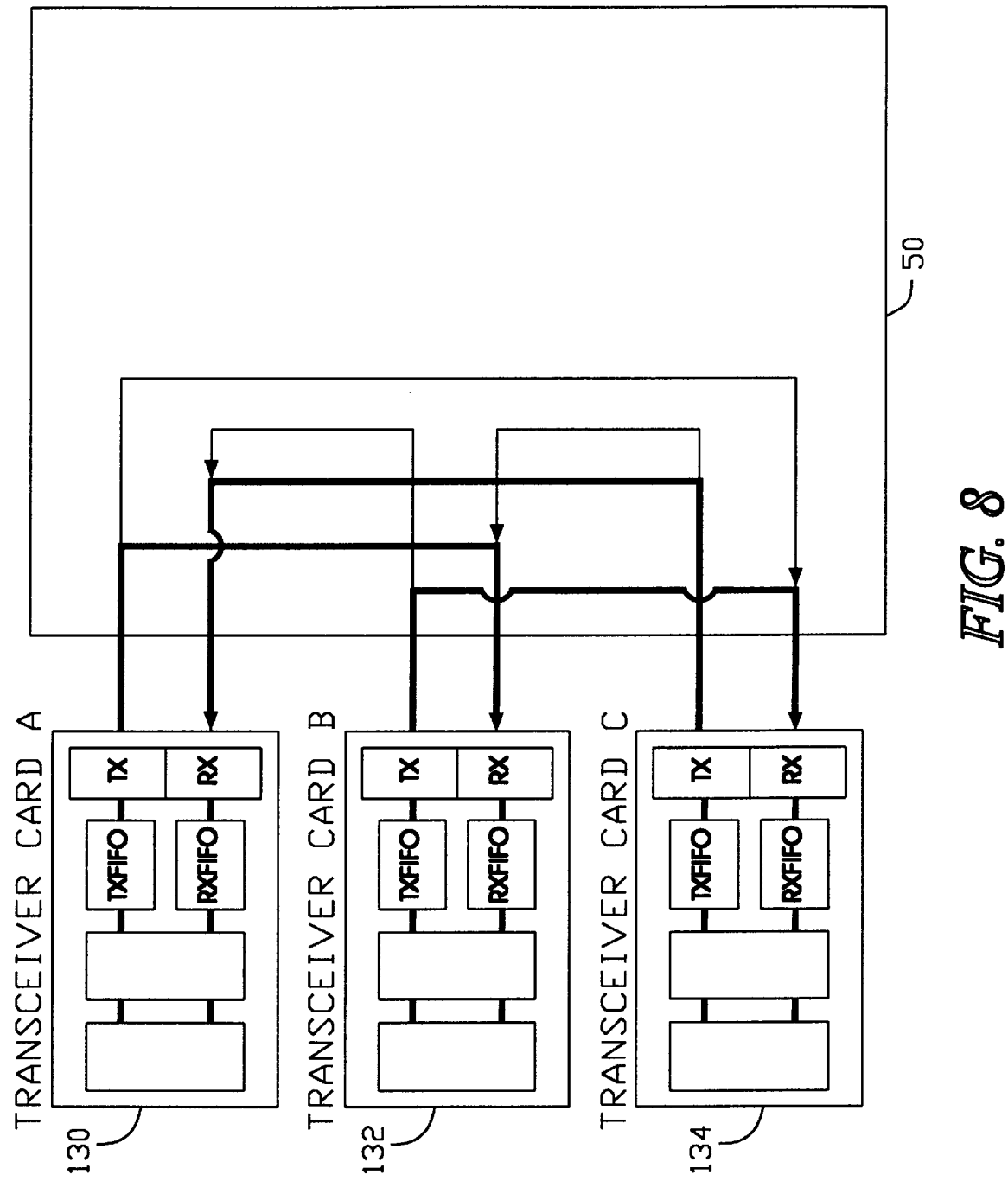
FIG. 8 is a semi-schematic block level diagram illustrating the use of overhead bits to accomplish low level flow control in a multi-transceiver implementation of the present invention.

Turning now to FIG. 8, there is shown a semi-schematic block diagram of an embodiment of the flow control feedback mechanism in accordance with the present invention.

In the embodiment of FIG. 8, information is being simultaneously transmitted and received by three transceiver port cards 130, 132 and 134, respectively indicated as port cards A, B and C, through a switch matrix unit 50. In the example, serial data streams are being transmitted by transceiver card A to transceiver card B; from transceiver card B to transceiver card C; and, from transceiver card C to transceiver card A. For purposes of the example, it is assumed that the receive FIFO in transceiver card C is filling up. Accordingly, transceiver card C must have some means of signaling its data transmission partner, transceiver card B to temporarily cease transmitting data. Transceiver card C appends the overhead bits comprising the NRTR flow control code (1,0) to the 32-bit data packet comprising its next transmission to the switch matrix. The arbitration logic and switch control circuitry (55 of FIG. 5), in combination with the port logic circuitry (56 of FIG. 5) evaluates the overhead bits from transceiver card C and recognizes that transceiver card C wishes to alert its transmission partner that it is no longer ready to receive data. Since all of the current switch matrix connections are made through the switch control and port logic circuitry, the switch matrix is able to identify the current transmission partner of transceiver card C as transceiver card B and is able to re-direct the NRTR signal to transceiver card B by stripping the overhead bits from the transceiver card C transmission character and re-appending them to the next transmission character directed to transceiver card B, i.e., onto the data stream coming from transceiver card A to transceiver card B. In this manner, transceiver card B is made aware that its transmission partner, i.e., the intended recipient of its transmitted data, is no longer ready to receive transmission characters and transceiver card B must temporarily stop sending data.

Using the overhead bits to provide flow control for data passing through the switch decreases utilization of the data bus used in conventional prior art-type implementations with a resulting increase in switch bandwidth. In addition, use of the round robin arbitration and switch control logic allows the data bus and processor of prior art implementations to be completely eliminated, along with the congestion associated with centralized control architecture.

To summarize, the switch port's transmitter sends out data words that come from the switch matrix, adding the appropriate overhead bit information for acknowledges, response bits and flow control. Acknowledges are used to signal a corresponding transceiver that a connection request has been granted. Response bits are used with a Multi-Queue connection request word, which need not be considered further herein. The flow control channel is used to pass state information from the receiving transceiver port to the transmitting transceiver port. The switch redirects the flow control signals to the correct output using the current switch connection state information contained within an arbitration logic and switch control circuit. Thus, the self routing and flow control architecture in accordance with the present invention, enables a significant improvement in overall system bandwidth utilization and significantly eases the task of the system designer in finding sufficient integrated circuit chip real estate to accommodate the circuitry necessary to perform all the requisite tasks.

Thus it is seen that the present invention provides a suitable transmission matrix, incorporating backplane transceivers and a crosspoint switch routing fabric, capable of self-synchronizing word boundaries between transceivers and the switch and frequency locking transceivers to a master bit and word clock signal developed in the switch. A low level flow control architecture utilizes overhead bits appended to a 32-bit data word to allow direct control over a transmitter by a receiving partner device, with the overhead bits also providing acknowledgment to connection requests and other information. One skilled in the art will appreciate that various changes, modifications and rearrangements may be made to the described embodiments without violating the scope and spirit of the invention. The described embodiments are provided for purposes of illustration and not of limitation. Accordingly, it is intended that the invention be limited only in terms of the appended claims.

What is claimed is:

1. A high speed communication switch circuit comprising:
   a plurality of switch ports for transmitting and receiving data;
   a switch fabric, the switch fabric providing routes for routing the data among and between the switch ports;
   a clock signal generator generating a clock signal defining bit periods for the data;
   a timing generator generating a word clock signal defining word cell boundaries for at least some of the data;
   an alignment word generator operatively coupled to at least one switch port for generating a switch alignment word for transmission by the at least one switch port;
   an alignment word detector operatively coupled to the at least one switch port for detecting a received alignment word received by the at least one switch port.

2. The high speed communication switch circuit of claim 1 wherein the switch ports comprise receive switch ports for receiving data and transmit switch ports for transmitting data.

3. The high speed communication switch circuit of claim 2 further comprising plurality of alignment word detectors, each alignment word detector operatively coupled to a corresponding receive switch port.

4. The high speed communication switch circuit of claim 3 further comprising a plurality of data recovery units operatively coupled to a corresponding receive switch port for recovering data received by the receive switch port.

5. The high speed communication switch circuit of claim 4 further comprising an arbitration circuit for configuring the switch fabric and port logic circuitry associated with each receive switch port for routing connection requests to the arbitration circuit.

6. The high speed communication switch circuit of claim 5 wherein the data comprises payload and overhead bits.

7. The high speed communication switch circuit of claim 6 further comprising routing means for routing the overhead bits received by a receive switch port to a transmit switch port, and wherein the port logic circuitry includes means for detecting the overhead bits received by the receive switch port and means for providing the routing means the overhead bits.

8. A method of synchronizing clock signals of transceivers and switches in a high speed data communication switching system comprising:

transmitting a reset request signal;

receiving a signal containing repetitions of a first predefined alignment word;

extracting a clock signal from the signal containing repetitions of the first predefined alignment word;

generating a receive word cell boundary clock signal based on the clock signal;

extracting a test alignment word from the signal containing repetitions of the first predefined alignment word using the clock signal and the receive word cell boundary clock signal; and determining if the test alignment word matches the first predefined alignment word.

9. The method of synchronizing clock signals of transceivers and switches in a high speed data communication switching system of claim 8 further comprising shifting the word cell boundary clock signal by a predefined period of the clock signal if the test alignment word does not match the predefined alignment word.

10. The method of synchronizing clock signals of transceivers and switches in a high speed data communication switching system of claim 9 further comprising:

generating a transmit word cell boundary based on the clock signal;

transmitting a second predefined alignment word using the transmit word cell boundary;

determining if a predefined idle word has been received after a predefined time period subsequent to transmitting the second predefined alignment word; and shifting the transmit word cell boundary by a predefined period of the clock signal if no predefined idle word has been received after the predefined time period subsequent to transmitting the second predefined alignment word.

11. The method of synchronizing clock signals of transceivers and switches in a high speed data communication switching system of claim 10 wherein the predefined period of the clock signal is one period.

12. The method of synchronizing clock signals of transceivers and switches in a high speed data communication switching system of claim 11 wherein the first predefined alignment word and the second predefined alignment word are comprised of like bit patterns.

* * * * *